United States Patent [19]
Pham et al.

[11] Patent Number: 5,681,193
[45] Date of Patent: Oct. 28, 1997

[54] DUAL VOLTAGE REGULATED SUPPLY CIRCUIT FOR A MARINE PROPULSION DEVICE

[75] Inventors: Thanh D. Pham, Lisle, Ill.; Richard J. Bragenzer, Kenosha, Wis.

[73] Assignee: Outboard Marine Corporation, Waukegan, Ill.

[21] Appl. No.: 507,028

[22] Filed: Jul. 25, 1995

[51] Int. Cl.$^6$ .................................................. B63H 21/22
[52] U.S. Cl. ..................................................................... 440/1
[58] Field of Search ........................... 440/77, 85, 86, 440/87, 88, 49, 1; 320/17, 57, 2; 310/146, 184, 198; 322/29, 90

[56] References Cited

U.S. PATENT DOCUMENTS

| | | | |
|---|---|---|---|
| 3,160,772 | 12/1964 | Miron | 310/146 |
| 3,551,784 | 12/1970 | Shaw et al. | 332/90 |
| 3,793,544 | 2/1974 | Baumgartner et al. | 320/17 |
| 4,117,390 | 9/1978 | Iwata et al. | 322/90 |
| 4,163,187 | 7/1979 | Tomas | 322/29 |
| 4,239,978 | 12/1980 | Kofink | 307/16 |
| 4,354,127 | 10/1982 | Stroud | 310/198 |
| 4,356,418 | 10/1982 | Stroud | 310/184 |
| 4,405,718 | 9/1983 | Gray | 320/17 |
| 4,788,486 | 11/1988 | Mashino et al. | 320/17 |
| 5,078,627 | 1/1992 | Anderson | 440/88 |
| 5,424,599 | 6/1995 | Stroud | 310/198 |

*Primary Examiner*—Stephen Avila
*Attorney, Agent, or Firm*—Jones, Day, Reavis & Pogue

[57] ABSTRACT

A marine propulsion device including a drive unit which is adapted to be mounted on a boat and which includes a propeller shaft, an internal combustion engine being drivingly connected to the propeller shaft and including an alternator generating first and second alternating current voltages, and a circuit for receiving the first and second alternating current voltages and for generating, in response to the first and second alternating current voltages, first and second direct current voltages for providing electrical power to the internal combustion engine.

9 Claims, 3 Drawing Sheets

5,681,193

DUAL VOLTAGE REGULATED SUPPLY CIRCUIT FOR A MARINE PROPULSION DEVICE

BACKGROUND OF THE INVENTION

The invention relates to marine propulsion devices, and particularly to an electrical distribution system for a marine propulsion device.

Typically, marine propulsion devices, i.e., outboard motorboat engines, inboard/outboard motorboat engines, and stern drive engines have an electrical system that is based on 12 volt direct current ("d.c.") operation. Typically, the watercraft is provided with a 12 volt d.c. battery for starting the engine, and the engine includes a 12 volt alternator that operates when the engine is running. The alternator generates an alternating current voltage that is rectified to provide a 12 volt d.c. current with which to charge the battery and provide electrical power for other electronic demands such as fuel injector operation or other boat accessories such as radios, depth finders, etc.

SUMMARY OF THE INVENTION

As engine sizes increase, electrical requirements and charging demands also tend to increase. Moreover, in the case of engines equipped with electronic fuel injectors and fuel pumps, a significant amount of electrical energy is required to operate the fuel injectors and fuel pumps. With the traditional 12 volt distribution system, this increased demand leaves only a small portion of electronic energy left to power accessories for the boat or to charge the battery.

One possible way of solving the above-identified problem is to increase the size of the alternator thereby increasing the current charging capacity to meet the increased electrical demands of the engine and accessories. However, in marine applications, the ability to increase the size and/or weight of the engine components is limited. Another possible solution to the above-identified problem is to increase the working voltage of the electrical system thereby allowing a reduction in the size of the fuel injector solenoids and the fuel pump solenoids as well as a reduction in the size of the alternator required to produce the current. However, the provision of an electrical distribution system that operates on a higher voltage is incompatible with most electrical boating accessories, i.e., radios, depth finders, etc. This is because most accessories are designed for operation on a 12 volt d.c. electrical distribution system.

Accordingly, the invention provides a marine propulsion device with an electrical distribution system that generates at least two voltage outputs: one voltage output at 12 volts for charging the system battery and for operating various boating accessories; and a second, higher voltage output for operating the fuel injectors, fuel pumps, etc., required by the engine. The marine propulsion device includes an alternator having a stator wound with at least two separate stator windings. The stator windings have a varying number of turns and are wound with different gauge wire. The alternator is electromagnetically coupled to the flywheel on the engine so that the alternator generates first and second alternating current ("a.c.") voltages in response to the rotation of the flywheel.

The system also includes a first voltage regulator connected to the alternator. The first voltage regulator regulates the first a.c. voltage to provide a rectified d.c. output voltage. The system also includes a second voltage regulator connected to the alternator. The second voltage regulator receives the second a.c. voltage from the alternator and generates in response to the a.c. voltage a rectified d.c. output voltage. The d.c. output of the second voltage regulator is connected serially to the d.c. output of the first voltage regulator so that the d.c. output voltage of the electrical distribution circuit is equivalent to the sum of the rectified d.c. voltages of the first and second a.c. voltages output from the alternator.

The invention also provides a marine propulsion device comprising: a drive unit which is adapted to be mounted on a boat and which includes a propeller shaft; an internal combustion engine being drivingly connected to the propeller shaft and including an alternator generating first and second alternating current voltages; and circuit means for receiving the first and second alternating current voltages and for generating, in response to the first and second alternating current voltages, first and second direct current voltages for providing electrical power to the internal combustion engine.

The invention also provides a marine propulsion device comprising: a drive unit which is adapted to be mounted on a boat and which includes a propeller shaft; an internal combustion engine being drivingly connected to the propeller shaft and including an alternator generating first and second alternating current voltages; a first voltage regulator, connected to the alternator to provide a first rectified, direct current output voltage from the first alternating current voltage; and a second voltage regulator, connected to the alternator and to the first voltage regulator so as to provide a second rectified, direct current output voltage from the second alternating current voltage and the first rectified, direct current output voltage.

The invention also provides an internal combustion engine comprising: an alternator generating first and second alternating current voltages; a first voltage regulator, connected to the alternator to provide a first rectified, direct current output voltage from the first alternating current voltage; and a second voltage regulator, connected to the alternator and to the first voltage regulator so as to provide a second rectified, direct current output voltage from the second alternating current voltage and the first rectified, direct current output voltage.

It is an advantage of the invention to provide an alternator that is a practical size and that satisfies the electrical demands placed on a marine electrical distribution system while still providing a 12 volt charging capacity.

It is another advantage of the invention to provide an alternator having more than one voltage output to provide electrical energy to charge the battery and to operate electrical accessories while also providing electrical power to engine fuel injectors, fuel pump, solenoids, etc.

Other features and advantages of the invention are set forth in the following detailed description and claims.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
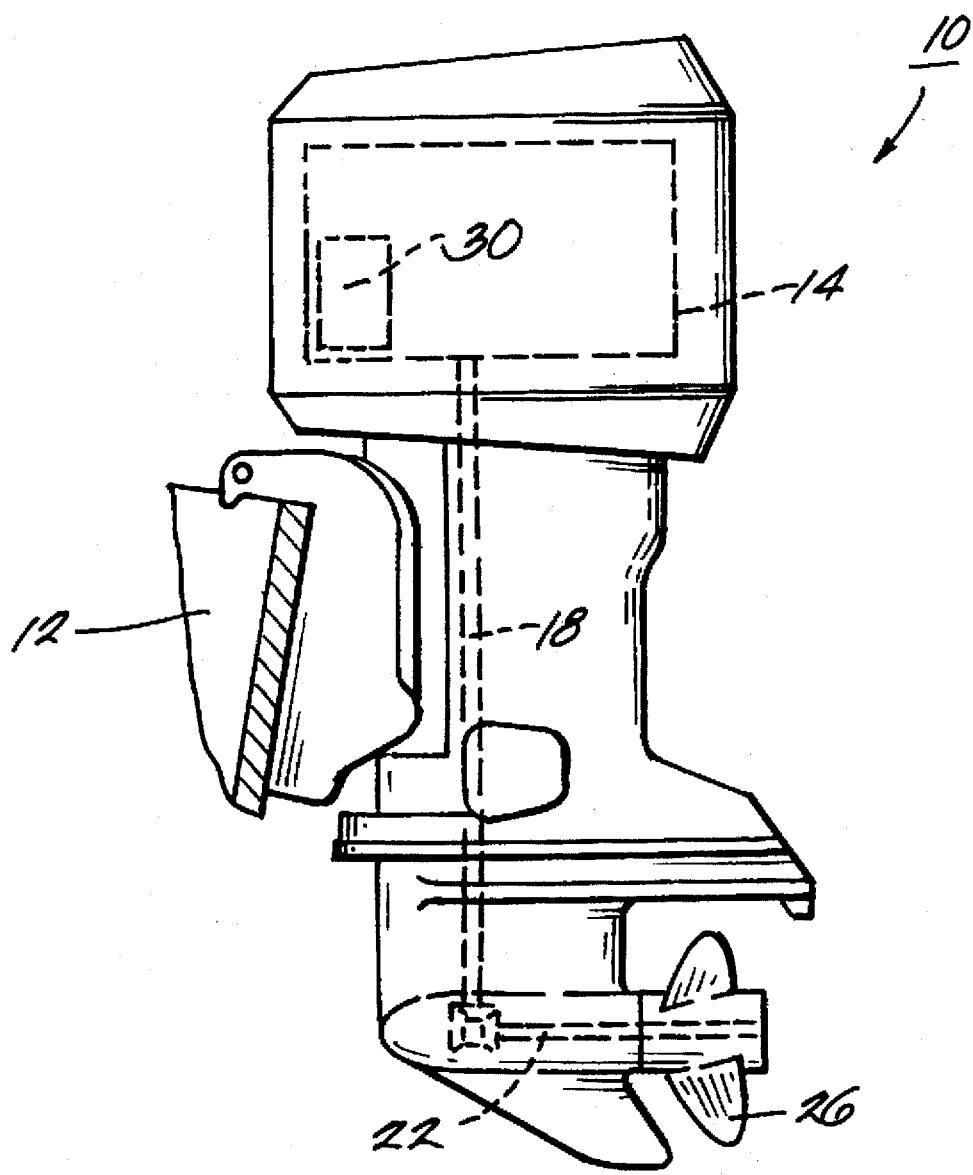
FIG. 1 is a side elevational view of an outboard motor embodying the invention.

Shown in FIG. 1 of the drawings is an outboard motor or marine propulsion device 10 adapted to be mounted on a boat 12. The outboard motor 10 includes an internal combustion engine 14. A drive shaft 18 is driven by the engine 14 and drives a propeller shaft 22 having thereon a propeller 26.

Figure 2:
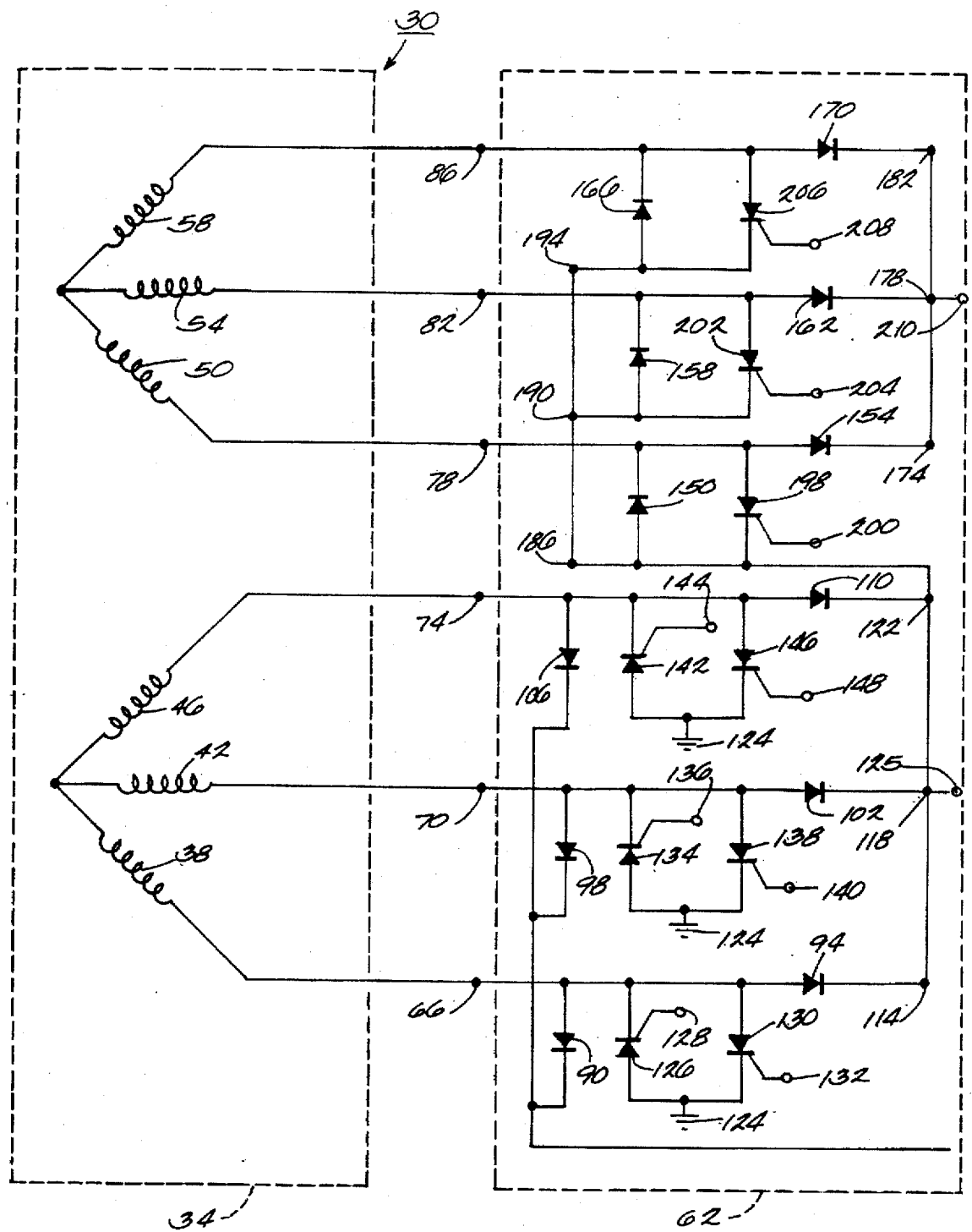
FIG. 2 is a schematic illustration of the stator and voltage rectifier/regulator of the outboard motor.

The outboard motor 10 includes a dual voltage alternator 30 (FIG. 2). While the dual voltage alternator 30 is described in the context of the outboard motor 10, the dual voltage alternator 30 can be easily adapted to any internal combustion engine.

As shown in FIG. 2, the alternator 30 has a stator 34 including six output windings 38, 42, 46, 50, 54, and 58, for generating thereon an alternating current ("a.c.") electrical output voltage in response to operation of the internal combustion engine 14.

The internal combustion engine 14 also includes a rectifier/regulator 62 connected to the stator 34 to rectify the a.c. outputs of the stator 34 and generate in response to the a.c. outputs of the stator 34 a pair of regulated direct current ("d.c.") voltages. As shown in FIG. 2, the rectifier/regulator 62 includes six inputs 66, 70, 74, 78, 82, and 86, for receiving the six a.c. output voltages from alternator windings 38, 42, 46, 50, 54, and 58, respectively. Rectifier/regulator inputs 66, 70, and 74 are connected to rectifying diodes 90 and 94, 98 and 102, and 106 and 110, respectively, to form three parallel connected rectifiers having outputs 114, 118 and 122, respectively. The rectifiers have a ground reference 124 and outputs 114, 118 and 122 are connected together to form a battery output 125. The battery output 125 is used to charge the battery (not shown) and to operate various electrical accessories used in connection with the boat. The combined voltage output to the battery is approximately 12 volts d.c. Silicon controlled rectifiers ("SCR"s) 126 and 130, 134 and 138, and 142 and 146 are connected between rectifying diodes 90 and 94, 98 and 102, and 106 and 110, respectively. SCRs 126, 134 and 142 include trigger inputs 128, 136 and 144, respectively, and allow adjustment of the voltages generated at outputs 114, 118 and 122. SCRs 130, 138 and 146 include trigger inputs 132, 140 and 148, respectively, and protect the electronic components of the internal combustion engine 14 against an open battery condition or an intermittent battery connection that might otherwise damage the engine electronics.

Rectifier/regulator inputs 78, 82 and 86 are connected to rectifying diodes 150 and 154, 158 and 162, and 166 and 170, respectively, to form three parallel connected rectifiers having outputs 174, 178 and 182. The rectifiers include reference nodes 186, 190 and 194 that are connected to the output 125. SCRs 198, 202 and 206 are connected between diodes 150 and 154, 158 and 162, and 166 and 170, respectively. SCRs 198, 202 and 206 include trigger inputs 200, 204 and 208, respectively, which may be used to selectively trigger SCRs 198, 202 and 206 to adjust the voltages generated at the outputs 174, 178, and 182. The outputs 174, 178 and 182 are connected together at output 210 and output 210 is electrically connected to the fuel injectors (not shown) to provide a direct current voltage output with which to operate the fuel injectors. In the embodiment shown in the drawings, the magnitude of the direct current output voltages to the fuel injectors is approximately 24 to 28 volts.

Figure 3:
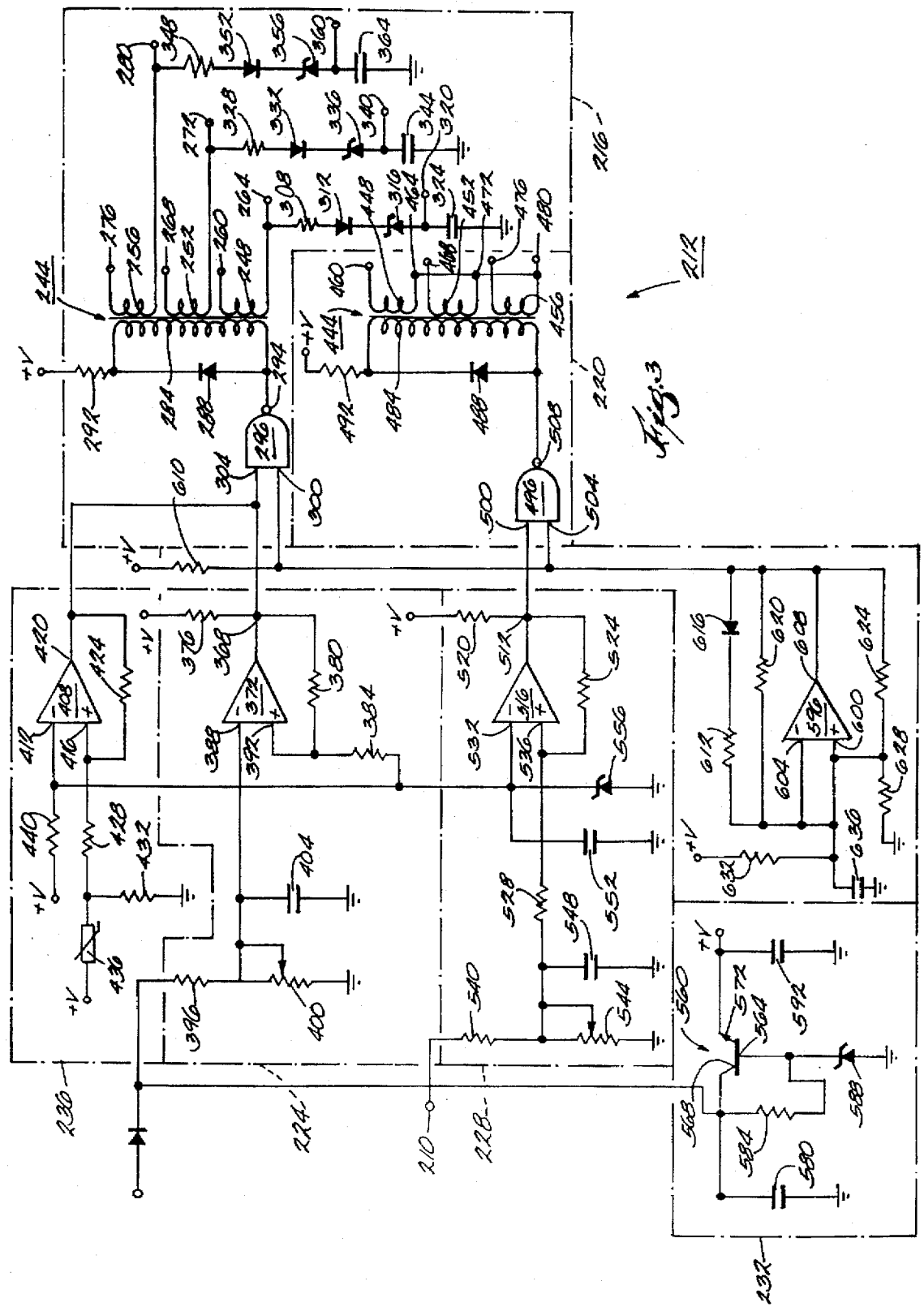
FIG. 3 is a schematic illustration of a control circuit for controlling the operation of the voltage rectifier/regulator.

The internal combustion engine 14 also includes (see FIG. 3) a control circuit 212 for providing SCR trigger signals to control the voltage output levels of the rectifier/regulator 62 and to protect the electronic components of the internal combustion engine 14. In general terms, and as shown in FIG. 3, the control circuit 212 includes an SCR driver circuit 216 for controlling the triggering of SCRs 126, 130, 134, 138, 142, and 146, SCR driver circuit 220 for controlling the triggering of SCRs 198, 202 and 206, voltage comparator circuits 224 and 228 connected to the driver circuits 216 and 220, respectively, an over-voltage protection circuit 232, an over-temperature protection circuit 236, and a pulse generator circuit 240.

More specifically, the SCR driver circuit 216 for controlling the rectifier outputs includes a transformer 244 having three secondary windings 248, 252 and 256. Secondary winding 248 has an output 260 connected to SCR 126 at 128 and an input 264 connected to alternator winding 38. Secondary winding 252 has an output 268 connected to SCR 134 at 136 and an input 272 connected to alternator winding 42. Secondary winding 256 has an output 276 connected to SCR 142 at 144 and an input 280 connected to alternator winding 46. The transformer 244 also includes a primary winding 284 connected in parallel with a diode 288 and to positive voltage supply (+V) through a resistor 292. The anode of diode 288 is connected to the output 294 of a NAND gate 296. RAND gate 296 has two inputs 300 and 304.

SCR driver circuit 216, at input 264 of secondary winding 248, also includes resistor 308, diode 312, zener diode 316, output node 320 and capacitor 324 connected serially between input 264 and ground. Output node 320 is connected to trigger input 132 of SCR 130. SCR driver circuit 216, at input 272 of secondary winding 250 also includes resistor 328, diode 332, zener diode 336, output node 340 and capacitor 344 connected serially between input 272 and ground. Output node 340 is connected to trigger input 140 of SCR 138. SCR driver circuit 216, at input 280 of secondary winding 256, also includes resistor 348, diode 352, zener diode 356, output node 360 and capacitor 364 connected serially between input 280 and ground. Output node 360 is connected to trigger input 148 of SCR 146. SCR driver circuit 216 generates SCR trigger outputs at output nodes 320, 340 and 360 to protect the electronic circuitry of the control circuit 212 in the event that the battery is open or has an intermittent connection.

The voltage comparator circuit 224 includes an output 368 connected to the input 304 of NAND gate 296. The output signal at output 368 is generated by operational amplifier 372 which is connected to and biased by resistors 376, 380 and 384. The operational amplifier 372 has an inverting input 388 and a non-inverting input 392 and receives at its inverting input 388 a calibrated voltage set by voltage divider network including resistors 396 and 400. Filtering capacitor 404 is connected in parallel to resistor 400. Resistor 396 is connected to rectifier/regulator output 125 to receive the battery voltage as an input to the comparator.

Input 304 of NAND gate 296 is also connected to over-temperature protection circuit 236. The over-temperature protection circuit 236 includes operational amplifier 408 having an inverting input 412, a non-inverting input 416 and an output 420. Circuit 236 also includes feedback resistor 424 connected between the output 420 and non-inverting input 416, and a resistive divider network connected to the non-inverting input 416 and including fixed resistors 428 and 432 and temperature sensitive resistor 436. The inverting input 412 is connected to positive voltage source (+V) through resistor 440.

SCR driver circuit 220 includes a transformer 444 having three secondary windings 448, 452 and 456. The secondary windings 448, 452 and 456 each have opposite ends 460 and 464, 468 and 472, and 476 and 480, respectively. The ends 464, 472 and 480 are connected together and to the battery to create an increased reference voltage level for the transformer 444. The end 460 of secondary winding 448 forms a triggering output connected to trigger input 208 of SCR 206, the end 468 of secondary winding 452 forms a triggering output connected to trigger input 204 of SCR 202, and the end 476 of secondary winding 456 forms a triggering output connected to trigger input 200 of SCR 198. The transformer 444 also includes a primary winding 484 which is electromagnetically coupled to the secondary windings 448, 452 and 456 and which is connected in parallel with diode 488. The primary winding 484 is also connected to positive voltage source (+V) through resistor 492. The SCR driver circuit 220 also includes a NAND gate 496 having two inputs 500 and 504, and an output 508. The output 508 of NAND gate 496 is connected to the anode of diode 488.

The voltage comparator circuit 228 includes an output 512 connected to the input 500 of NAND gate 496. The output signal at output 512 is generated by operational amplifier 516 which is connected to and biased by resistors 520, 524 and 528. The operational amplifier 516 has an inverting input 532 and a non-inverting input 536 and receives at its inverting input 532 a calibrated voltage set by a voltage divider network including resistors 540 and 544. Filtering capacitor 548 is connected in parallel to resistor 544. The inverting input 532 of operational amplifier 516 is connected to resistor 440 and to ground via parallel connected capacitor 552 and zener diode 556. It should be noted that resistor 440, capacitor 552 and zener diode 556 set the reference voltage for the operation of voltage comparator circuits 224 and 228. Resistor 540 is connected to rectifier/regulator output 210 to receive as an input to the comparator 516 the fuel injector operating voltage.

The over-voltage protection circuit 232 includes a transistor 560 having a base 564, a collector 568 and an emitter 572. The collector 568 is connected to the positive battery terminal 125 through a diode 576 and to ground through a capacitor 580. Diode 576 prevents damage from occurring to the control circuit 212 in the event that the battery terminals are incorrectly connected. A resistor 584 is connected between the collector 568 and the base 564. The base 564 and resistor 584 are together connected to ground through a zener diode 588. Emitter 572 is connected to ground through capacitor 592 and to the remainder of the control circuit 212 to generate the positive voltage source (+V) upon which the control circuit 212 operates.

The pulse generator circuit 240 achieves switching of SCRs 126, 134 and 142, and prevents permanent latching of the SCRs 126, 134 and 142. That is, if simple direct current is used to trigger the SCRs 126, 134 and 142, the SCRs will latch "ON" and the battery will overcharge. The free running oscillator includes an operational amplifier 596 having a non-inverting input 600, an inverting input 604 and an output 608. The output 608 is connected to positive voltage (+V) through resistor 610. A resistor 612 and a diode 616 are serially connected between the output 608 and the inverting input 604. A resistor 620 is connected in parallel to the serial combination of resistor 612 and diode 616. A resistor 624 is connected between the output 608 and the non-inverting input 600 of operational amplifier 596. The non-inverting input 600 is connected to ground via a resistor 628 and to the positive voltage source (+V) via a resistor 632. The input 600 and 604 are connected to ground via a capacitor 636.

In operation, as the internal combustion engine 14 operates, alternating current voltages are generated at the outputs 66, 70, 74, 78, 82, and 86 of the stator 34 of the alternator 30. These voltages are transmitted to rectifier/regulator 62 where they are full-wave rectified and are output to the battery at output 125 for charging the battery and to the fuel injectors at output 210 for operating the fuel injectors. If the battery is charged to a level greater than or equal to approximately 14.5 volts d.c., then voltage comparator circuit 224 turns off causing SCR driver circuit 216 to generate SCR trigger signals to SCRs 126, 134 and 142 to prevent a battery over-voltage condition which could destroy the battery.

Alternatively, if the fuel injector voltage is greater than approximately 28 volts, then comparator circuit 228 turns off causing SCR driver circuit 220 to generate SCR trigger signals to SCRs 198, 202 and 206 to reduce the voltage of the rectifier/regulator at output 210 thereby preventing damage to the fuel injectors and the engine 14.

If the control circuit 212 operating temperature exceeds a predetermined threshold, thermistor 436 and operational amplifier 408 generate an output to shut down SCR driver circuit 216 to prevent engine damage from occurring.

Various features and advantages of the invention are set forth in the following claims.

We claim:

1. A dual voltage regulated power supply comprising:
   an electromagnetically controlled alternator having first and second three-phase windings for generating first and second three-phase alternating current outputs;
   first and second voltage regulators coupled to respective ones of said first and second three-phase a.c. outputs to control the magnitude of the first and second three-phase a.c. outputs;
   first and second rectifier circuits coupled to respective ones of the first and second three-phase alternating current outputs for providing a first d.c. output voltage and a second d.c. output voltage;
   a single battery coupled to only the first rectifier circuit for receiving only said first d.c. output voltage as a battery charging voltage; and
   circuit means for electrically coupling said first and second rectifier circuits in electrical series to provide a second d.c. output voltage that is substantially the sum of said first and second d.c. output voltages.

2. The dual voltage regulator of claim 1 further including first and second control circuits each coupled to a respective one of said first and second voltage regulators for controlling the magnitude of the output voltage of said first and second voltage regulators.

3. The dual voltage regulator of claim 2 wherein said first and second voltage regulators comprise:
   a first group of silicon controlled rectifiers, each silicon controlled rectifier in said first group being coupled between a ground plane and each phase of the first three-phase alternating current output; and
   a second group of silicon controlled rectifiers, each silicon controlled rectifier in said second group being coupled between each phase of the second three-phase alternating current output and the circuit means coupling the first and second rectifiers in electrical series.

4. The dual voltage regulator of claim 3 wherein said first control circuit includes:

a first voltage comparator circuit for comparing said battery voltage to a reference voltage; and a first output circuit coupled to said first voltage comparator circuit and said first group of silicon controlled rectifiers for generating silicon controlled rectifier trigger signals to said first group of silicon controlled rectifiers to cause conduction of said silicon controlled rectifiers if said battery is charged to a predetermined level.

5. The dual voltage regulator of claim 4 wherein said second control circuit includes:

a second voltage comparator circuit for comparing said second d.c. output voltage with a second reference voltage; and a second output circuit coupled to said second voltage comparator circuit and said second group of silicon controlled rectifiers for generating silicon controlled rectifier trigger signals to cause conduction of said second group of silicon controlled rectifiers if said second d.c. output voltage exceeds a predetermined level.

6. The dual voltage regulator of claim 5 further including an overvoltage protection circuit.

7. The dual voltage regulator of claim 6 wherein the overvoltage protection circuit comprises:

a circuit coupled to said battery for generating a regulated output voltage; and said regulated output voltage providing a power source for said first and second voltage comparators and said first and second output circuits.

8. The dual voltage regulator of claim 4 further comprising an overtemperature protection circuit for limiting the output voltage of said first output circuit if a predetermined temperature occurs.

9. The dual voltage regulator of claim 8 wherein the overtemperature protection circuit comprises:

an operational amplifier having an inverting input and a non-inverting input;

a zener diode coupled to the inverting input to establish a reference input voltage;

a temperature sensitive resistor coupled to the non-inverting input to cause an output of said operational amplifier if a predetermined temperature occurs; and said operational amplifier being coupled to said first output circuit of said first control circuit to limit the output voltage of said first output circuit if said predetermined temperature occurs.

* * * * *